Patented Oct. 1, 1929

1,730,197

UNITED STATES PATENT OFFICE

GEORGE W. ELSEY, OF ANDERSON, INDIANA, ASSIGNOR TO DELCO-REMY CORPORATION, OF DAYTON, OHIO, A CORPORATION OF DELAWARE

ANCHORING DEVICE

Application filed June 1, 1928. Serial No. 283,967.

This invention relates to improvements in anchoring devices.

It is among the objects of the present invention to provide a device adapted to prevent movement between a plurality of flexible members attached in stacked relation to a part.

Further objects and advantages of the present invention will be apparent from the following description, reference being had to the accompanying drawings, wherein a preferred embodiment of one form of the present invention is clearly shown.

Figure 1:
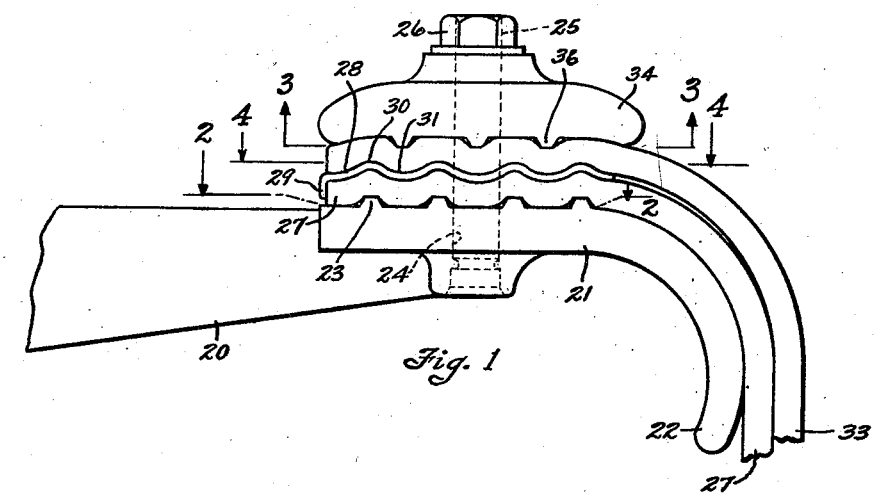
Fig. 1 shows two flexible members attached to an arm.
Figure 2:
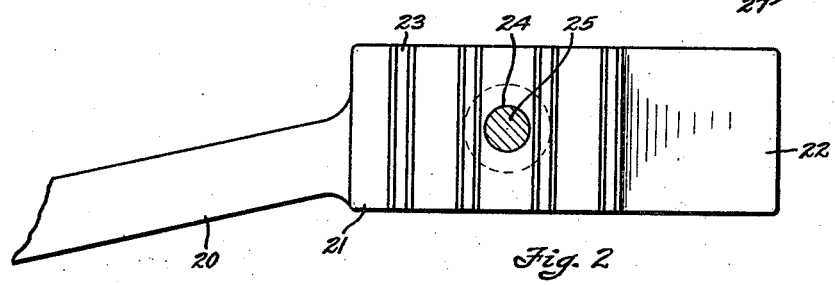
Fig. 2 is a detail, fragmentary view of the arm taken along line 2—2 of Fig. 1.
Figure 3:
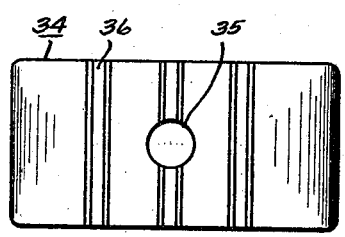
Fig. 3 is a detail view of the clamping plate taken along line 3—3 of Fig. 1.
Figure 4:
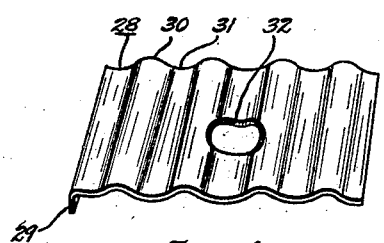
Fig. 4 is a detail view of the corrugated grip plate taken along line 4—4 of Fig. 1.

Referring to the drawings, the invention is shown applied to a shock absorber operating arm. The numeral 20 designates the arm, the free end of which is provided with a platform portion 21 having a curved outer end 22. The one surface of the platform portion 21 has spaced, transverse ribs 23 and an opening 24 between the two inner ribs. In this opening 24 there is secured a stud 25 extending from the ribbed side of the platform 21, the outer end of said stud being screw-threaded to receive a nut 26.

The end of a flexible member 27 is placed upon the ribbed surface of the platform 21 and extends over the curved end thereof. Upon this flexible member 27 is placed the corrugated grip plate 28, having an angular end 29 adapted to fit over the end of the flexible member 27. The plate 28 comprises alternate ridges and grooves 30 and 31 respectively, the ridges 30 aligning with the spaces between ribs 23 and the grooves with said ribs. An opening 32 in the grip plate 28 fits over the stud 25, thus the plate 28 is held in proper alignment with the flexible member 27 and platform 21.

A second flexible member 33 is placed upon the first member 27, the grip plate 28, however, being interposed between said flexible members 33 and 27 adjacent their ends.

A clamping plate 34 having an opening 35 for receiving stud 25, is placed upon the second or top-most flexible member 33. Plate 34 has spaced ribs 36 transversely arranged on the surface adjacent the member 33, said ribs aligning with ridges 30 of the corrugated grip plate 28.

When the parts are all assembled as stated, the nut 26 is operated toward the clamping plate 34 causing the flexible members 27 and 33 and the grip plate 28 to be clamped between the platform 21 and the clamping plate 34.

Relative movement between the flexible members 27 and 33 is substantially prevented, for the clamping effect of plate 34 causes its ribs 36 to press member 33 so that it will conform to the undulations of grip plate 28. Pressure upon the one side of member 27 by the corrugated grip plate 28 and on the other side by ribbed platform 21 causes member 27 to conform to the undulations of the grip plate 28 which consequently prevents relative longitudinal movement between members 27 and 33.

While the form of embodiment of the present invention as herein disclosed, constitutes a preferred form, it is to be understood that other forms might be suggested, all coming within the scope of the claims which follow.

What is claimed is as follows:

1. A device for attaching the ends of flexible members to a part, comprising in combination, ribs extending transversely across the one surface of the part, stacked flexible members on said ribbed surface, a corrugated grip plate between adjacent flexible members, a clamping plate on the topmost flexible member, and clamping means extending through the part, flexible members, corrugated grip plates and clamping plate, said means clamping all of the members of the assembly together.

2. A device for attaching the ends of flexible members to a part, comprising in combination, spaced, transverse ribs on one surface of the part, stacked flexible members on said surface of the part, a corrugated grip plate between adjacent flexible members, said plate having ridges and grooves adapted to align with the spaces and ribs, respectively, of the part, a clamping plate on the uppermost flexible member, having spaced, transverse ribs engaging said member, said ribs aligning with the ridges of the corrugated plate, and a clamping means extending through the part, flexible members, corrugated grip plates and clamping plate, properly aligning said parts and clamping all of them together.

3. A device for attaching flexible members to a part, comprising in combination, extending lug portions on one surface of the part, flexible members on said surface of the part, in stacked relation, a corrugated plate between adjacent flexible members, a clamping plate on the uppermost flexible member, and a clamping bolt extending through the part, flexible and corrugated plates, said bolt having a head portion and a nut for clamping the parts together.

4. A device for attaching the ends of flexible members to a part comprising, in combination, lugs extending from one surface of the part, flexible members in stacked relation having one end resting upon the surface of the part provided with lugs, a grip plate, provided with indents spaced correspondingly to the lugs on the part, between adjacent flexible members so that each indent aligns substantially with a lug, a clamping plate on the topmost flexible member, and a clamping member extending through the part, flexible members, grip plates and clamping plate to clamp them together.

5. A device for attaching the ends of flexible members to a part comprising, in combination, lugs extending from one surface of the part, flexible members in stacked relation having one end resting upon the surface of the part provided with lugs, a grip plate between said flexible members, said grip plate having indents spaced to correspond and align with the lugs on the part, a clamping plate upon the topmost flexible member, and means for clamping all of the members of the assembly together.

6. A device for attaching the ends of flexible members to a part, comprising in combination, flexible members in stacked relation, an indented grip plate between them, and means for clamping the members and plate to the part, said means including clamping plates having surfaces shaped so as to cause the flexible members to conform to the indents of the grip plate.

7. A device for attaching the ends of flexible members to a part, comprising in combination, flexible members in stacked relation, an indented grip plate between them, clamping plates between which the members and grip plate are clamped, said clamping plates having surfaces shaped so as to cause the flexible members to conform to the indents of the grip plate, and means for causing the clamping plates to grip the flexible members and including a part passing through the plates and members.

In testimony whereof I hereto affix my signature.

GEORGE W. ELSEY.